United States Patent [19]

Naito

[11] Patent Number: 4,550,423
[45] Date of Patent: Oct. 29, 1985

[54] STEREO MPX CIRCUIT

[75] Inventor: Michinori Naito, Tokyo, Japan

[73] Assignee: Trio Kabushiki Kaisha, Tokyo, Japan

[21] Appl. No.: 576,905

[22] Filed: Feb. 3, 1984

[30] Foreign Application Priority Data

Feb. 9, 1983 [JP] Japan .................................. 58-18753
Feb. 24, 1983 [JP] Japan .................................. 58-28433

[51] Int. Cl.$^4$ .............................................. H04H 5/00
[52] U.S. Cl. .......................................... 381/13; 455/63
[58] Field of Search ....................... 381/1, 2, 3, 4, 10, 381/13; 332/37 R; 455/295, 296, 50, 63

[56] References Cited

U.S. PATENT DOCUMENTS 4,356,350 10/1982 Ienaka .................................... 381/13

4,502,148 2/1985 Ishida et al. .......................... 381/13

Primary Examiner—Forester W. Isen
Attorney, Agent, or Firm—Murray, Whisenhunt & Ferguson

[57] ABSTRACT

A stereo multiplex circuit which can reduce a distortion of an FM demodulated signal to be generated due to nonlinearity of the frequency vs. amplitude/phase characteristics of a band-pass filter at an intermediate frequency amplifier stage of an FM receiver. This circuit includes a circuit for multiplying signals consisting of right-channel and left-channel signals and for adjusting the level of this multiplication signal into a suitable magnitude and thereafter inserting into the right and left channels, thereby causing a harmonic distortion to disappear.

3 Claims, 8 Drawing Figures

STEREO MPX CIRCUIT

TECHNICAL FIELD

The present invention relates to a stereo multiplex circuit of an FM receiver and, more particularly, to a stereo MPX circuit to suppress a distortion to be generated due to the characteristic of a band-pass filter at the intermediate frequency stage.

BACKGROUND ART

A band-pass filter at the intermediate frequency amplifier stage of ordinary FM receivers does not have ideal frequency vs. amplitude/phase characteristics over a desired frequency band. Particularly, in the case where a modulating signal is a stereo composite signal, for example, of which the components of which the subcarrier of 38 kHz was carrier suppression amplitude modulated by a differential signal (L−R) for the right and left channels are easily subjected to distortion due to nonlinearity of the frequency vs. amplitude/phase characteristics of a band-pass filter at this intermediate frequency amplifier stage. These distortions depend upon the characteristic of the band-pass filter, and the second and third harmonic distortions are generally serious problems.

When right-channel and left-channel signals L and R are decoded by a stereo MPX circuit on the basis of the main signal (L+R) and the differential signal (L−R) modulated subsignal which was subjected to distortion, distortion occurs in output signals L and R in the right and left channels. Therefore, although a method has been tried to improve linearity over a wide range of the frequency vs. amplitude/phase characteristics of the band-pass filter at the intermediate frequency amplifier stage, its effect is unsatisfactory or there is a problem such that an apparatus to realize such a purpose can be very expensive.

It is, therefore, a general object of the present invention to provide a stereo MPX circuit which can reduce the distortion to be caused in the right-channel and left-channel signals obtained from the stereo composite signal which was subjected to distortion.

A more specific object of the present invention is to provide a stereo MPX circuit which can set off the distortion to be caused in the right-channel and left-channel signals obtained from the stereo differential signal which was subjected to second or third harmonic distortion.

SUMMARY OF THE INVENTION

A stereo MPX circuit according to the present invention comprises: a circuit to multiply signals consisting of right-channel and left-channel signals of a stereo composite signal; a circuit to adjusting the level of the magnitude of an output of this multiplier; and a circuit to insert an output of this level control into the stereo right and left channels, thereby eliminating the harmonic distortion from the right-channel and left-channel signals.

One technical feature of the present invention is based on that it is possible to synthesize and create the harmonic distortion components generated in a stereo decoded signal from right and left stereo decoded signals by a relatively simple arithmetic operation circuit.

BRIEF DESCRIPTION OF THE DRAWINGS

The foregoing features and objectives together with the operation of the present invention will be more apparent from the following description, taken in conjunction with the drawings, in which.

DESCRIPTION OF THE ILLUSTRATIVE EMBODIMENTS

Figure 1:
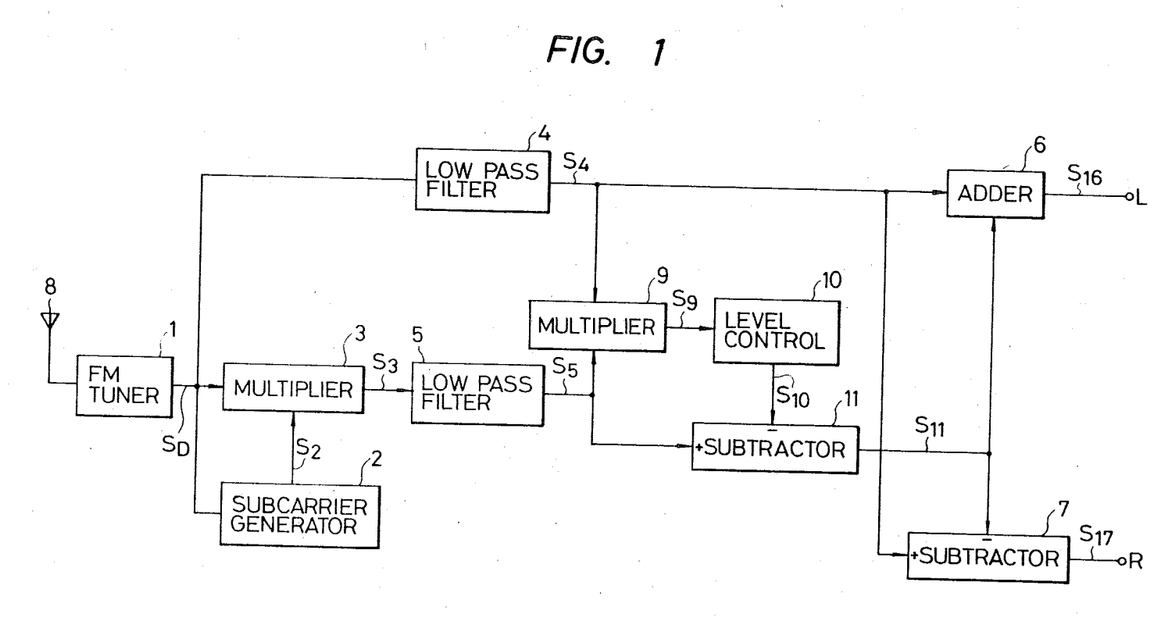
FIGS. 1–3 respectively show first, second and third embodiments of a stereo MPX circuit according to the present invention, and any embodiment serves to compensate the second harmonic distortion.
Figure 2:
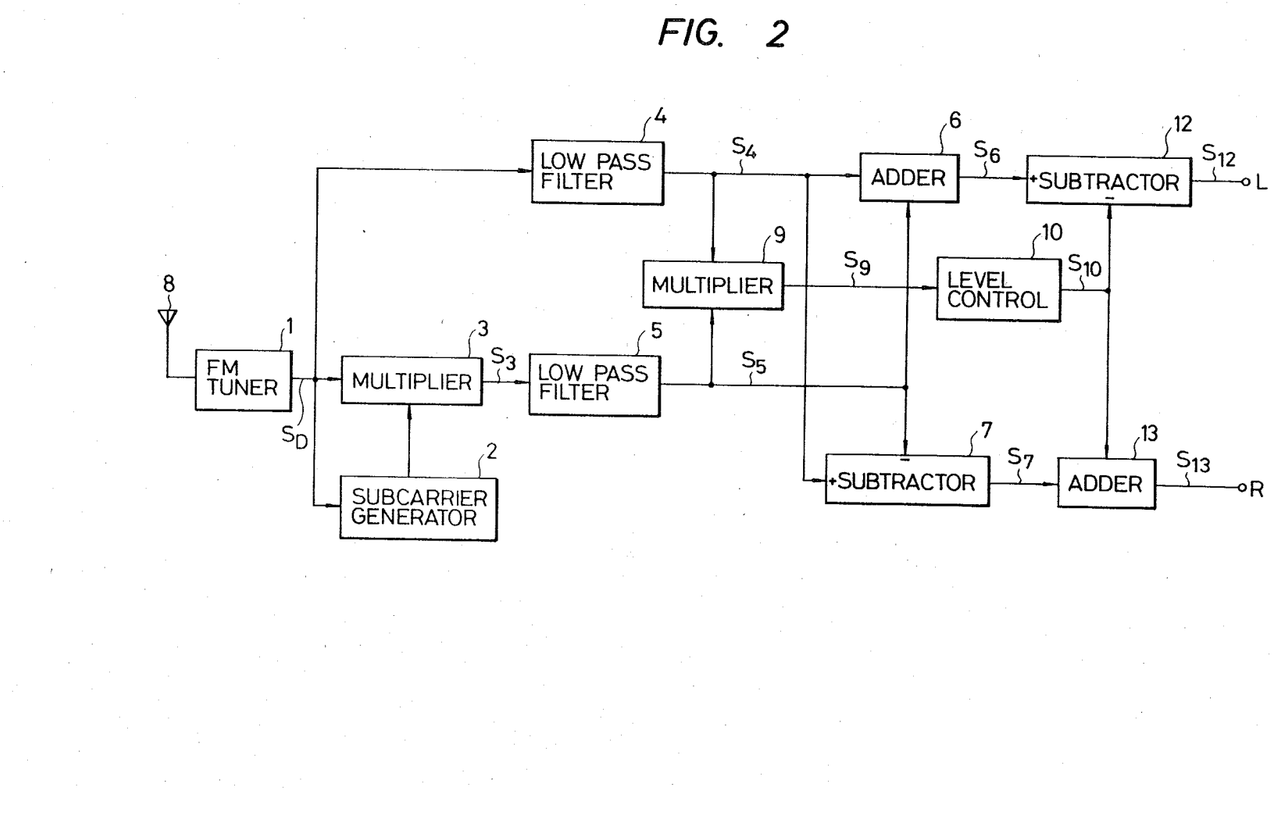
Figure 3:
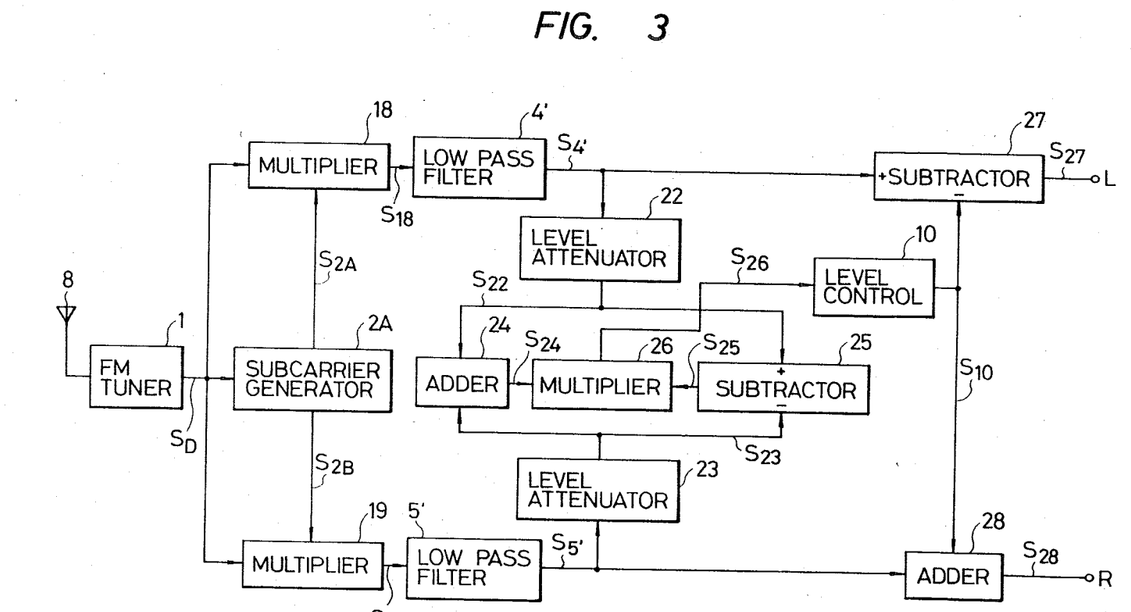

In FIGS. 1–3, there are shown three embodiments of a stereo MPX circuit to compensate the second harmonic distortion of a subsignal to be produced due to nonlinearity of the frequency vs. amplitude/phase characteristics of a band-pass filter at the intermediate frequency amplifier stage.

For description, when it is now considered the case where only a left-channel signal $L=\cos pt$ ($0 < p \leq 2\pi \times 15$ kHz) of the stereo exists, a modulated signal $S_M$ is represented by $$S_M = \frac{(L+R)}{2} + \frac{(L-R)}{2} \cos \omega_c t$$

$$= \frac{1}{2} \cos pt + \frac{1}{2} \cos pt \cos \omega_c t$$

In the above expression, a pilot signal is omitted and $\omega_c$ indicates a subcarrier frequency. The first term of the right-hand side denotes a main-signal, while the second term indicates a sub-signal.

On the other hand, an FM-demodulated signal $S_D$ when the broadcast of the above-mentioned modulating signal was received by an FM tuner can be represented by $$S_D = \tfrac{1}{2} \cos pt + \tfrac{1}{4} \cos (\omega_c+p)t + \tfrac{1}{4} \cos (\omega_c-p)t + k \cos (\omega_c+2p)t + k \cos (\omega_c-2p)t$$

if only the second harmonic distortion components of the sub-signal to be produced due to the influence of nonlinearity of a band-pass filter at the intermediate frequency stage are considered. Wherein, k is a constant.

In the stereo MPX circuit of FIG. 1 showing the first embodiment, the section consisting of the following components represents a conventional stereo MPX circuit of the matrix system: i.e., a subcarrier generator 2 to output a subcarrier using a pilot signal from an output signal of an FM tuner 1, i.e., from an FM demodulated signal; a multiplier 3 to multiply this FM demodulated signal and an output signal of the subcarrier generator 2; a low-pass filter 4 to extract a main-signal from the FM demodulated signal; a low-pass filter 5 which constitutes a synchronous detector together with the multiplier 3 and outputs a sub-signal from a double side-band signal due to the sub-signal; an adder 6 to add an output signal of the low-pass filter 4 and an output signal of the low-pass filter 5; and a subtractor 7 to subtract the output signal of the low-pass filter 5 from the output signal of the low-pass filter 4. On the other hand, the section consisting of a multiplier 9, a level control 10 and a subtractor 11 is added according to the present invention. A reference numeral 8 denotes an antenna.

Now, an output signal $S_2$ of the subcarrier generator 2 is $$S_2 = 2 \cos \omega_c t$$

While an output signal $S_3$ of the multiplier 3 is $$\begin{aligned} S_3 &= S_D \times S_2 \\ &= \frac{1}{2} \cos(\omega_c + p)t + \frac{1}{2} \cos(\omega_c - p)t \\ &\quad + \frac{1}{4} \cos pt + \frac{1}{4} \cos(2\omega_c + p)t \\ &\quad + \frac{1}{4} \cos pt + \frac{1}{4} \cos(2\omega_c - p)t \\ &\quad + k \cos 2pt + k \cos(2\omega_c + 2p)t \\ &\quad + k \cos 2pt + k \cos(2\omega_c - 2p)t \end{aligned}$$

In addition, an output signal $S_4$ of the low-pass filter 4 and an output signal $S_5$ of the low-pass filter 5 are $$S_4 = L + R = \frac{1}{2} \cos pt$$

$$S_5 = L - R = \frac{1}{2} \cos pt + 2k \cos 2pt$$

Therefore, in the case where there are not provided the circuits 9, 10 and 11 which were added according to the present invention, an output signal $S_6$ of the adder 6 and an output signal $S_7$ of the subtractor will be $$S_6 = S_4 + S_5 = \cos pt + 2k \cos 2pt$$

$$S_7 = S_4 - S_5 = -2k \cos 2pt$$

As described above, according to a conventional stereo MPX circuit, there is a drawback such that the second harmonic distortion occurs in the stereo demodulated output signal due to the multiplication of the components $(\omega_c + 2p)$ and $(\omega_c - 2p)$ of the fourth and fifth terms in the expression representing the FM demodulated signal $S_D$ with the subcarrier signal in the stereo MPX circuit.

A stereo MPX circuit of the present invention is constituted in such a manner that in addition to a conventional stereo MPX circuit there are further provided: the multiplier 9 for multiplying the output signal $S_4$ of the low-pass filter 4 with the output signal $S_5$ of the low-pass filter 5; the level control 10 for adjusting the level of an output signal $S_9$ of the multiplier 9; and the subtractor 11 for subtracting an output signal $S_{10}$ of the level control 10 from the output signal $S_5$ of the low-pass filter 5, whereby an output signal $S_{11}$ of the subtractor 11 is supplied to the adder 6 and the subtractor 7 in place of the output signal $S_5$ of the low-pass filter 5 shown in FIG. 1.

The output signal $S_9$ of the multiplier 9 is $$\begin{aligned} S_9 &= S_4 \times S_5 \\ &= \frac{1}{4} + \frac{1}{4} \cos 2pt + \frac{1}{2} k \cos 3pt + \frac{1}{2} k \cos pt \end{aligned}$$

Assuming that the level ratio between the input and the output of the level control 10 is $l$, the output signal $S_{10}$ of the level control 10 is $$S_{10} = \frac{l}{4} + \frac{l}{4} \cos 2pt + \frac{l}{2} k \cos 3pt + \frac{l}{2} k \cos pt$$

Since it is now discussed a range where the magnitude of the distortion components is very small than the level of the fundamental wave signal, it is possible to consider that $k \ll 1$ and $l \ll 1$. In addition, since the DC components are independent of the signal, they may be omitted. Then, we obtain $$S_{10} \approx \frac{1}{4} l \cos 2pt$$

The output signal $S_{11}$ of the subtractor 11 is $$S_{11} = S_5 - S_{10} = \frac{1}{2} \cos pt + \left(2k - \frac{l}{4}\right) \cos 2pt$$

Therefore, an output signal $S_{16}$ of the adder 6 and an output signal $S_{17}$ of the subtractor 7 are $$S_{16} = S_4 + S_{11} = \cos pt + \left(2k - \frac{l}{4}\right) \cos 2pt$$

$$S_{17} = S_4 - S_{11} = \left(2k - \frac{l}{4}\right) \cos 2pt$$

When the level ratio is now set into $l = 8k$ in the level control 10, the stereo demodulated signals are $S_{16} = L = \cos pt$ and $S_{17} = R = 0$. That is to say, the components of cos 2pt in the output signal $S_{16}$ of the adder 6 and in the output signal $S_{17}$ of the subtractor 7 become zero, so that the second harmonic distortion components do not exist in the stereo demodulated signal.

Also, in the case where a constant k in the FM demodulated signal $S_D$ has a negative value due to variations in frequency vs. amplitude characteristic and frequency vs. phase characteristic of the band-pass filter in the intermediate frequency, a similar effect can be obtained by setting the level ratio l of the level control 10 into $(-l)$.

In addition, in this first embodiment, the case has been described as an example whereby the low-pass filters 4 and 5 were equipped on the input sides of the adder 6 and subtractor 7. However, a similar effect will be expected even if the low-pass filters 4 and 5 are equipped on the output sides of the adder 6 and subtractor 7.

A second embodiment of the present invention will now be described.

FIG. 2 is a block diagram showing a constitution of the second embodiment of the present invention. This second embodiment shows an example of a stereo MPX circuit of the matrix system.

The stereo MPX circuit of this second embodiment is constituted in such a manner that in addition to a conventional stereo MPX circuit including the multiplier 9 and level control 10 shown in FIG. 1, there are provided: a subtractor 12 for subtracting the output signal $S_{10}$ of the level control 10 from the output signal $S_6$ of the adder 6; and an adder 13 for adding the output signal $S_7$ of the subtractor 7 and the output signal $S_{10}$ of the level control 10.

The action of this second embodiment constituted as described above is as follows.

An output signal $S_{12}$ of the subtractor 12 and an output signal $S_{13}$ of the adder 13 are $$S_{12} = S_6 - S_{10}$$

$$= \cos pt + \left(2k - \frac{l}{4}\right) \cos 2pt$$

$$S_{13} = S_7 + S_{10}$$

$$= \left(\frac{l}{4} - 2k\right) \cos 2pt$$

When the level ratio of the level control 10 is set into $l=8k$, the second embodiment of the present invention acts in the similar manner as in the case of the first embodiment.

In the above first and second embodiments of the present invention, it has been described the case of the stereo MPX circuit of the matrix system using the adder 6 and subtractor 7 as an example. The case of the stereo MPX circuit of the switching system will now be described as a third embodiment of the present invention.

FIG. 3 is a block diagram showing a constitution of the third embodiment of the present invention.

The stereo MPX circuit of this third embodiment has a following compensation circuit for eliminating the second harmonic distortion components in addition to a conventional stereo MPX circuit of the switching system comprising: a subcarrier generator 2A for generating subcarrier frequency signals $S_{2A}$ and $S_{2B}$ which are synchronized with the pilot signal in the FM demodulated signal $S_D$ output from the FM tuner 1 and which have the mutually opposite phases; a multiplier 18 for multiplying the FM demodulated signal $S_D$ with the subcarrier signal $S_{2A}$ output from the subcarrier generator 2A; a multiplier 19 for multiplying the FM demodulated signal $S_D$ with the subcarrier signal $S_{2B}$ output from the subcarrier generator 2A; and low-pass filters 4' and 5' for respectively eliminating the frequency components out of the voice band from output signals $S_{18}$ and $S_{19}$ of the multipliers 18 and 19. This compensation circuit comprises: an attenuator 22 for reducing the level of an output $S_4'$ of the low-pass filter 4' by half; an attenuator 23 for reducing the level of an output signal $S_5'$ of the low-pass filter 5' by half; an adder 24 for adding an output signal $S_{22}$ of the attenuator 22 and an output signal $S_{23}$ of the attenuator 23; a subtractor 25 for subtracting the output signal $S_{23}$ of the attenuator 23 from the output signal $S_{22}$ of the attenuator 22; a multiplier 26 for multiplying an output signal $S_{24}$ of the adder 24 with an output signal $S_{25}$ of the subtractor 25; the level control 10 for adjusting the level of an output signal $S_{26}$ of the multiplier 26; a subtractor 27 for subtracting the output signal $S_{10}$ of the level control 10 from the output signal $S_4'$ of the low-pass filter 4'; and an adder 28 for adding the output signal $S_5'$ of the low-pass filter 5' and the output signal $S_{10}$ of the level control 10.

The action of this third embodiment constituted as described above is as follows.

The subcarrier signals $S_{2A}$ and $S_{2B}$ to be output from the subcarrier generator 2A can be represented respectively as follows, $$S_{2A} = 1 + 2 \cos \omega_c t$$

$$S_{2B} = 1 - 2 \cos \omega_c t$$

The output signal $S_{18}$ of the multiplier 18 is $$S_{18} = S_D \times (1 + \cos 2\omega_c t)$$

$$= \frac{1}{2} \cos pt + \frac{1}{4} \cos(\omega_c + p)t + \frac{1}{4} \cos(\omega_c - p)t$$

$$+ k \cos(\omega_c + 2p)t + k(\omega_c - 2p)t$$

$$+ \frac{1}{2} \cos(\omega + p)t + \frac{1}{2} \cos(\omega - p)t + \frac{1}{4} \cos pt$$

$$+ \frac{1}{4} \cos(2\omega_c + p)t + \frac{1}{4} \cos pt + \frac{1}{4} \cos(2\omega_c - p)t$$

$$+ k \cos 2pt + k \cos(2\omega_c + 2p)t$$

$$+ k \cos 2pt + k \cos(2\omega_c - 2p)t$$

The transmission of the components exceeding the voice signal band in the output signal $S_{18}$ is prevented by the low-pass filter 4', so that the output signal $S_4'$ of the low-pass filter 4' becomes $$S_4' = \cos pt + 2k \cos 2pt$$

Similarly, the output signal $S_5'$ of the low-pass filter 5' becomes $$S_5' = -2k \cos 2pt$$

The output signals $S_4'$ and $S_5'$ are the output signals of a conventional stereo MPX circuit of the switching system, and that the second harmonic distortion components of the fundamental wave exist is similar to the case of the stereo MPX circuit of the matrix system.

The output signal $S_{22}$ of the attenuator 22 and the output signal $S_{23}$ of the attenuator 23 are $$S_{22} = \tfrac{1}{2} \cos pt + k \cos 2pt$$

$$S_{23} = -k \cos 2pt$$

The output signal $S_{24}$ of the adder 24 and the output signal $S_{25}$ of the subtractor 25 are $$S_{24} = \tfrac{1}{2} \cos pt$$

$$S_{25} = \tfrac{1}{2} \cos pt + 2k \cos 2pt$$

The output signal $S_{26}$ of the multiplier 26 is $$S_{26} = \tfrac{1}{4} + \tfrac{1}{4} \cos 2pt + \tfrac{1}{2} k \cos 3pt + \tfrac{1}{2} k \cos pt$$

This output signal $S_{26}$ is the same as the output signal $S_9$ of the multiplier 9 in the first embodiment. Therefore, the output signal $S_{10}$ of the level control 10, an output signal $S_{27}$ of the subtractor 27, and an output signal $S_{28}$ of the adder 28 are $$S_{10} = \frac{l}{4} + \frac{l}{4} \cos 2pt + \frac{l}{2} k \cos 3pt + \frac{l}{2} k \cos pt$$

$$\approx \frac{l}{4} \cos 2pt$$

$$S_{27} = \cos pt + \left(2k - \frac{l}{4}\right) \cos 2pt$$

$$S_{28} = \left(\frac{l}{4} - 2k\right) \cos 2pt$$

Now, since the level ratio l of the level control 10 is set into l=8k, the second harmonic distortion components do not exist in the stereo demodulated signal $S_D$ and a similar effect is obtained even in the stereo MPX circuit of the switching system.

In addition, the low-pass filters 4' and 5' will act in the similar manner even if they are equipped on the output sides of the subtractor 27 and adder 28, respectively.

Moreover, when a constant k has a negative value, it is enough to set the level ratio l into (−1), and this is similar to the case of the first embodiment.

Also, the compensation circuit in the third embodiment can be applied as it is to the output side of a conventional stereo MPX circuit of the matrix system, and even in this case, the same action and effect as in the case of the third embodiment can be obtained.

As described above, according to the present invention, when the signal of which the left or right channel of stereo was modulated by the voice signal is demodulated, it is possible to suppress the second harmonic distortion components in the stereo demodulated signal to be caused due to the frequency vs. amplitude characteristic and frequency vs. phase characteristic, or the like of the band-pass filter at the intermediate frequency stage.

REDUCTION OF THE THIRD DISTORTION

Figure 4:
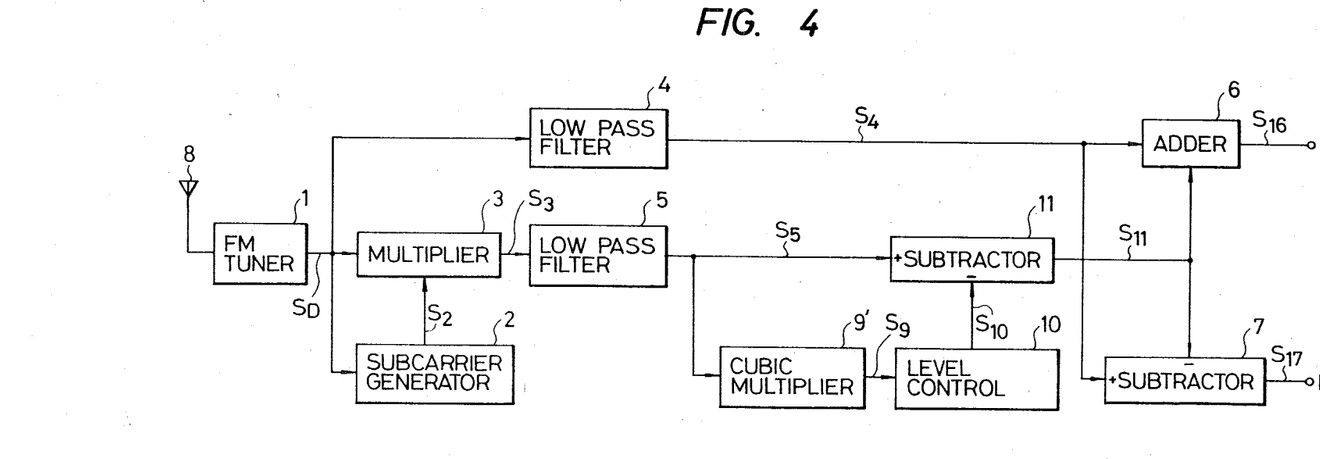
FIGS. 4, 6 and 7 respectively show fourth, fifth and sixth embodiments of a stereo MPX circuit according to the present invention, and any embodiment serves to compensate the third harmonic distortion.
Figure 6:
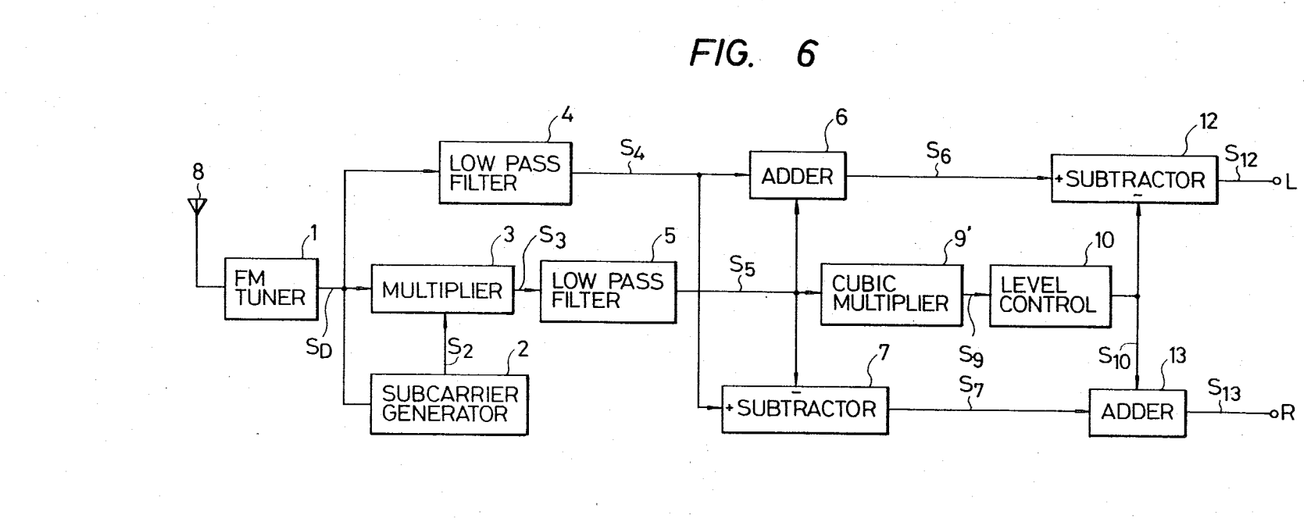
Figure 7:
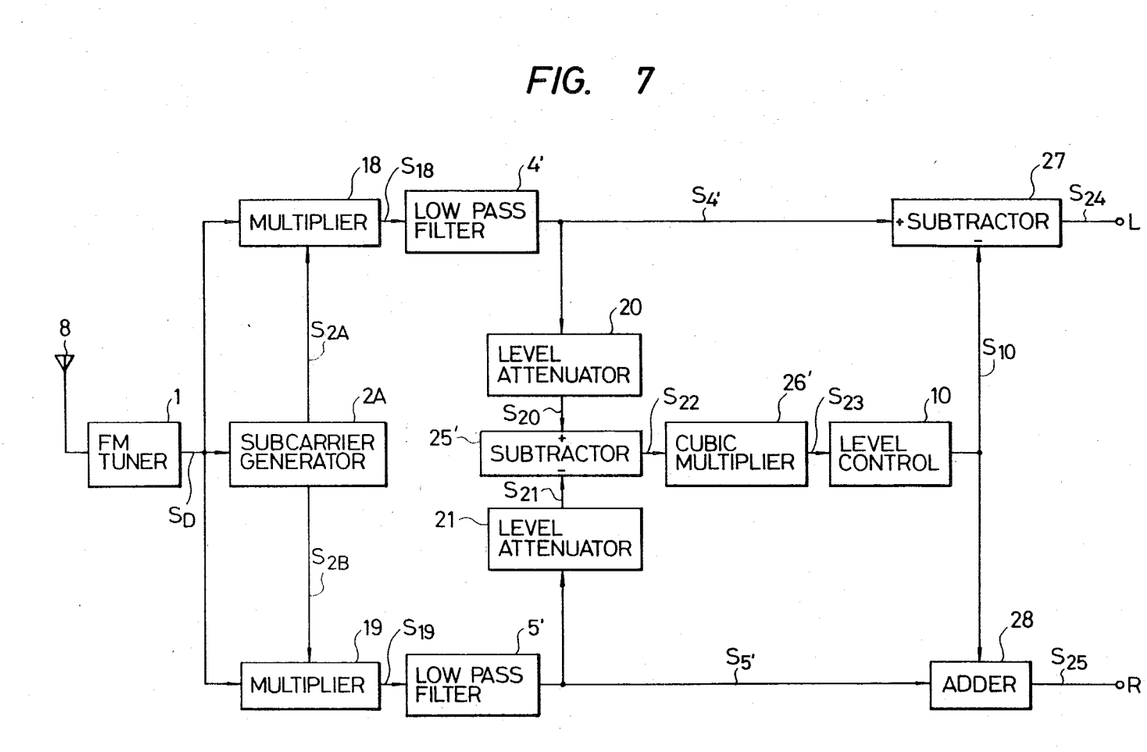

An embodiment of a stereo MPX circuit for compensating the third harmonic distortion is shown in FIGS. 4, 6 and 7.

For description, when assuming that the left-channel signal of stereo is $L = \frac{1}{2} \cos pt$ and the right-channel signal is $R = -\frac{1}{2} \cos pt$, the modulating signal $S_M$ is represented by $$S_m = \frac{(L + R)}{2} + \frac{(L - R)}{2} \cos \omega_c t$$

$$= 0 + \cos pt \cos \omega_c t$$

$$= \frac{1}{2} \cos(\omega_c + p)t + \frac{1}{2} \cos(\omega_c - p)t$$

Since it is now discussed the harmonic distortion of the subsignal in the above expression, the pilot signal is omitted.

When considering only the third harmonic distortion components to be caused due to nonlinearity of the band-pass filter at the intermediate frequency stage, the FM demodulated signal $S_D$ when the FM broadcasting wave of this modulating signal $S_M$ was received by the FM tuner can be represented by $S_D = \frac{1}{2} \cos (\omega_c+p)t + \frac{1}{2} \cos (\omega_c-p)t + k \cos (\omega_c+3p)t + k \cos (\omega_c-3p)t$ Wherein, k is a constant to be determined by the characteristic of the band-pass filter at the intermediate frequency amplifier stage.

In the stereo MPX circuit of the fourth embodiment shown in FIG. 4, the cubic multiplier 9, the level control 10 and the subtractor 11 are added to the constitution of a conventional stereo MPX circuit of the matrix system.

When considering only the third harmonic distortion components to be caused due to the influence of the band-pass filter at the intermediate frequency stage, the FM demodulated signal $S_D$ when the broadcast of the above-mentioned modulating signal $S_M$ was received by the FM tuner can be expressed by $S_D = \frac{1}{2} \cos (\omega_c+p)t + \frac{1}{2} \cos (\omega_c-p)t + k \cos (\omega_c+3p)t + k \cos (\omega_c-3p)t$ Wherein, k is a constant to be determined by the characteristic represented by the band-pass filter at the intermediate frequency stage.

The output signal $S_2$ of the subcarrier generator 2 is $S_2 = 2 \cos \omega_c t$ Also, the output signal $S_3$ of the multiplier 3 is $$S_3 = S_D \times S_2$$

$$= \cos pt + \frac{1}{2} \cos(2\omega_c + p)t + \frac{1}{2} \cos(2\omega_c - p)t$$

$$+ 2k \cos 3pt + k \cos(2\omega_c + 3p)t + k \cos(2\omega_c - 3p)t$$

In addition, the output signals $S_4$ and $S_5$ of the low-pass filters 4 and 5 are respectively $S_4 = 0$ $S_5 = \cos pt + 2k \cos 3pt$ Therefore, without the circuits 9, 11 and 10 according to the present invention, the output signal $S_6$ of the adder 6 and the output signal $S_7$ of the subtractor 7 are respectively $S_6 = \cos pt + 2k \cos 3pt$ $S_7 = -\cos pt - 2k \cos 3pt$ Thus, according to a conventional stereo MPX circuit, as described above, the components of $(\omega_c+3p)$ and $(\omega_c-3p)$ of the third and fourth terms in the FM demodulated signal $S_D$ become the 3p components, so that there is a drawback such that the third harmonic distortion of the fundamental wave occurs.

FIG. 4 is a block diagram showing a constitution of the fourth embodiment of the present invention. This fourth embodiment shows an example of the stereo MPX circuit of the matrix system.

The stereo MPX circuit of the fourth embodiment of the present invention is constituted in such a manner that in addition to a conventional stereo MPX circuit, there are further provided: the cubic multiplier 9 for cubing the output signal $S_5$ of the low-pass filter 5; the level control 10 for adjusting the level of the output signal $S_9$ of the cubic multiplier 9; and the subtractor 11 for subtracting the output signal $S_{10}$ of the level control 10 from the output signal $S_5$ of the low-pass filter 5, whereby the output signal of the subtractor 11 is supplied to the adder 6 and subtractor 7 in place of the output signal $S_5$ of the low-pass filter 5 shown in FIG. 1.

Figure 5:
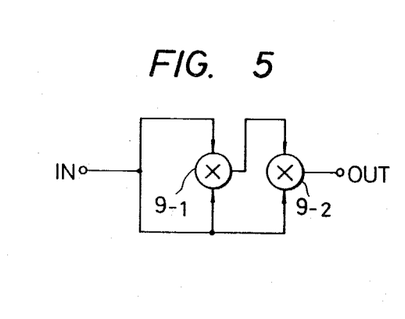
FIG. 5 is a diagram showing a practical constitution of a cubic multiplier which is used in the fourth to sixth embodiment.

The cubic multiplier 9' here can be constituted by, for example as shown in FIG. 5, a multiplier 9-1 for squaring the input signal and a multiplier 9-2 for multiplying the output signal of the multiplier 9-1 with the input signal.

The output signal $S_5$ of the low-pass filter 5 is cubed by the cubic multiplier 9'. The output signal $S_9$ of the cubic multiplier 9' is $$S_9 = (S_5)^3 = (\cos pt + 2k \cos 3pt)^3$$
$$= \cos^3 pt + 6k \cos^2 pt \cos 3pt + 6k \cos pt \cos^2 3pt + 8k^3 \cos^3 3pt$$

Now, assuming that the input/output level ratio of the level control 10 is set to l, the output signal $S_{10}$ of the level control 10 is $$S_{10} = lS_9 = l\cos^3 pt + 6kl \cos^2 pt \cos 3pt + 6kl \cos pt \cos^2 3pt + 8k^3l \cos^3 3pt$$

Since it is now discussed the range where the magnitude of the distortion components is very small than the level of the fundamental wave signal, it is set such that $|k| << 1$ and $|l| << 1$. Therefore, we have $$S_{10} \approx l \cos^3 pt$$

Thus, the output signal $S_{11}$ of the subtractor 11 is $$S_{11} = S_5 - S_{10}$$
$$= \cos pt + 2k \cos 3pt - l\cos^3 pt$$
$$= \left(1 - \frac{3}{4} l\right) \cos pt + \left(2k - \frac{1}{4} l\right) \cos 3pt$$

Therefore, the output signal $S_{16}$ of the adder 6 and the output signal $S_{17}$ of the subtractor 7 are respectively $$S_{16} = S_4 + S_{11}$$
$$= \left(1 - \frac{3}{4} l\right) \cos pt + \left(2k - \frac{1}{4} l\right) \cos 3pt$$
$$S_{17} = S_4 - S_{11}$$
$$= -\left(1 - \frac{3}{4} l\right) \cos pt - \left(2k - \frac{1}{4} l\right) \cos 3pt$$

If the level ratio is set into $l = 8k$, the components of cos 3pt in the stereo demodulated signals, i.e., in the output signal $S_{16}$ of the adder 6 and in the output signal $S_{17}$ of the subtractor 7 become zero, so that the third harmonic distortion does not exists in the stereo signal components.

In addition, in the case where a constant k in the FM demodulated signal $S_D$ has a negative value due to variations in frequency vs. amplitude characteristic and frequency vs. phase characteristic of the band-pass filter at the intermediate frequency stage, by setting the level ratio l of the level control 10 into $(-1)$, a similar effect can be obtained.

Furthermore, in this fourth embodiment, the case has been described as an example whereby the low-pass filters 4 and 5 were equipped on the input sides of the adder 6 and subtractor 7. However, a similar effect will be obtained even if the low-pass filters 4 and 5 are equipped on the output sides of the adder 6 and subtractor 7.

A fifth embodiment of the present invention will now be described.

FIG. 6 is a block diagram showing a constitution of the fifth embodiment of the present invention. This fifth embodiment shows an example of a stereo MPX circuit of the matrix system.

The stereo MPX circuit of the fifth embodiment is constituted in such a manner that in addition to a conventional stereo MPX circuit, there are provided: the cubic multiplier 9' and level control 10 shown in FIG. 4; the subtractor 12 for subtracting the output signal $S_{10}$ of the level control 10 from the output signal $S_6$ of the adder 6; and the adder 13 for adding the output signal of the subtractor 7 and the output signal $S_{10}$ of the level control 10.

The output signal $S_{12}$ of the subtractor 12 and the output signal $S_{13}$ of the adder 13 are respectively $$S_{12} = S_6 - S_{10}$$
$$= \cos pt + 2k \cos 3pt - l\cos^3 pt$$
$$= \left(1 - \frac{3}{4} l\right) \cos pt + \left(2k - \frac{1}{4} l\right) \cos 3pt$$
$$S_{13} = S_7 + S_{10}$$
$$= -\cos pt - 2k \cos 3pt + l\cos^3 pt$$
$$= -\left(1 - \frac{3}{4} l\right) \cos pt - \left(2k - \frac{1}{4} l\right) \cos 3pt$$

Since the level ratio l of the level control 10 is set into $l = 8k$, the fifth embodiment of the present invention also similarly acts as in the case of the fourth embodiment.

In the above fourth and fifth embodiments of the present invention, the case of the stereo MPX circuit of the matrix system has been described as an example. A stereo MPX circuit of the switching system will now be described as a sixth embodiment of the present invention.

FIG. 7 is a block diagram showing a constitution of the sixth embodiment of the present invention.

The stereo MPX circuit of this sixth embodiment is constituted in such a manner that a following compensation circuit for eliminating the third harmonic distortion components is equipped to a conventional stereo MPX circuit of the switching system comprising: a subcarrier generator $2_A$ for generating subcarrier frequency signals $S_{2A}$ and $S_{2B}$ whose phases are synchronized with the pilot signal in the FM demodulated signal $S_D$ output from the FM tuner 1 and which have the mutually opposite phases; the multiplier 18 for multiplying the FM demodulated signal $S_D$ with the subcarrier signal $S_{2A}$ output from the subcarrier generator $2_A$; the multiplier 19 for multiplying the FM demodulated signal $S_D$ with the subcarrier signal $S_{2B}$ output from the subcarrier generator $2_A$; and the low-pass filters 4' and 5' for respectively eliminating the frequency components out of the voice signal band from the output signals $S_{18}$ and $S_{19}$ of the multipliers 18 and 19. This compensation circuit comprises: an attenuator 20 for reducing the level of the output signal $S_4'$ of the low-pass filter 4' by half; an attenuator 21 for reducing the level of the output signal $S_5'$ of the low-pass filter 5' by half; the subtractor 25' for subtracting an output signal $S_{21}$ of the attenuator 21 from an output signal $S_{20}$ of the attenuator 20; the cubic multiplier 26' for cubing the output signal $S_{22}$ of the subtractor 25'; the level control 10 for adjusting the level of the output signal $S_{23}$ of the cubic multiplier 26'; the subtractor 27 for subtracting the output signal $S_{10}$ of the level control 10 from the output signal $S_4'$ of the low-pass filter 4'; and the adder 28 for adding the output signal $S_5'$ of the low-pass filter 5' and the output signal $S_{10}$ of the level control 10.

The subcarrier signal $S_{2A}$ and $S_{2B}$ to be output from the subcarrier generator $2_A$ can be expressed respectively by $$S_{2A} = 1 + 2\cos\omega_c t$$

$$S_{2B} = 1 - 2\cos\omega_c t$$

The output signal $S_{18}$ of the multiplier 18 is $$S_{18} = S_D \times S_{2A}$$

$$= \left\{ \frac{1}{2}\cos(\omega_c + p)t + \frac{1}{2}\cos(\omega_c - p)t + k\cos(\omega_c + 3p)t + k\cos(\omega_c - 3p)t \right\} \times \{1 + 2\cos\omega_c t\}$$

$$= \frac{1}{2}\cos(\omega_c + p)t + \frac{1}{2}\cos(\omega_c - p)t + k\cos(\omega_c + 3p)t + k\cos(\omega_c - 3p)t + \cos pt + \frac{1}{2}\cos(2\omega_c + p)t + \frac{1}{2}\cos(2\omega_c - p)t + 2k\cos 3pt + k\cos(2\omega_c + 3p)t + k\cos(2\omega_c - 3p)t$$

Therefore, the output signal $S_4'$ of the low-pass filter 4' is $$S_4' = \cos pt + 2k\cos 3pt$$

Similarly, the output signal $S_5'$ of the low-pass filter 5' is $$S_5' = -\cos pt - 2k\cos 3pt$$

The output signals $S_4'$ and $S_5'$ are the stereo demodulated output signals of the conventional stereo MPX circuit of the switching system, and that the third harmonic distortion components of the fundamental wave exist is similar to the case of the stereo MPX circuit of the matrix system.

The output signals $S_{20}$ and $S_{21}$ of the attenuators 20 and 21 are respectively $$S_{20} = \tfrac{1}{2}\cos pt + k\cos 3pt$$

$$S_{21} = -\tfrac{1}{2}\cos pt - k\cos 3pt$$

The output signal $S_{22}$ of the subtractor 25' is $$S_{22} = S_{20} - S_{21}$$
$$= \cos pt + 2k\cos 3pt$$

The output signal $S_{23}$ of the cubic multiplier 26' is $$S_{23} = (S_{22})^3 = (\cos pt + 2k\cos 3pt)^3$$

This signal is the same as the output signal $S_9$ of the multiplier 9' in the cases of the fourth and fifth embodiments of the present invention shown in FIGS. 4 and 6. By performing the same omission as in the cases of the fourth and fifth embodiments of the present invention, the output signal $S_{10}$ of the level control 10 is also $$S_{10} = l \times S_{23} = l\cos^3 pt$$

Therefore, the output signals $S_{24}$ and $S_{25}$ of the subtractor 27 and adder 28 are respectively $$S_{24} = \left(1 - \frac{3}{4}l\right)\cos pt + \left(2k - \frac{l}{4}\right)\cos 3pt$$

$$S_{25} = -\left(1 - \frac{3}{4}l\right)\cos pt - \left(2k - \frac{l}{4}\right)\cos 3pt$$

If the level ratio l of the level control 10 is set into $l = 8k$, the third harmonic distortion components do not exist in the output signals $S_{24}$ and $S_{25}$, i.e., in the stereo demodulated signals, so that a similar effect will be obtained even in the stereo MPX circuit of the switching system.

In addition, for description in comparison with the fourth and fifth embodiments of the present invention shown in FIGS. 4 and 6, the case has been described whereby the attenuators 20 and 21 were inserted. However, the attenuator 20 or 21 can be omitted if the level ratio of the level control 10 is properly set.

Furthermore, the low-pass filters 4' and 5' will act in the similar manner even if they are equipped on the output sides of the subtractor 24 and adder 25, respectively.

In addition, if a constant k has a negative value, the level ratio l may be set into (−l), and this is similar to the case of the fourth embodiment.

Moreover, the compensation circuit in this sixth embodiment can be applied as it is to the stereo MPX circuit of the matrix system, and even in this case, the same action and effect as in the case of the sixth embodiment can be obtained.

Figure 8:
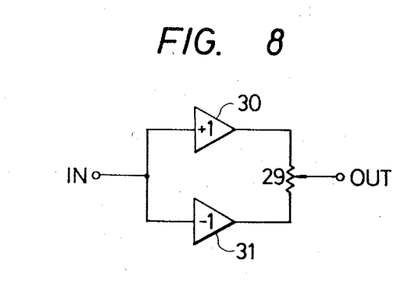
FIG. 8 is a diagram showing a practical constitution of a level control of the embodiments of the present invention.

Also, since a constant k is determined depending upon the band-pass filter of the intermediate frequency, it is ordinary that the level ratio of the level control 10 is decided into either positive or negative value. However, in order to make it possible to cope with both positive and negative constants k, for example as shown in FIG. 8, the level control 10 may be constituted by a noninversional amplifier 30 and an inversional amplifier 31 each having a gain of 1, and a variable resistor 29 for synthesizing an output of the noninversional amplifier 27 and an output of the inversional amplifier 28, thereby adjusting the level ratio into either positive or negative value depending upon the position of a slidable contact of the variable resistor 29.

I claim:

1. In combination, a stereo multiplex circuit for outputting right-channel and left-channel signals by decoding a stereo composite signal;

a circuit for multiplying signals consisting of said right-channel and left-channel signals;

a circuit for receiving an output signal of said multiplier and for adjusting the level of the magnitude, thereby to output; and a circuit for inserting an output signal of said level control circuit into the right and left channels to compensate high-order harmonic distortion in the right and left channels, wherein a level ratio of input/output of said level control circuit is set to a value so as to minimize the high-order harmonic distortion in the right and left channels existing prior to insertion of the output of said level control circuit into the right and left channels by said inserting circuit.

2. A stereo multiplex circuit in accordance with claim 1, wherein said multiplier multiplies a sum signal and a differential signal of the right-channel and left-channel signals, and wherein said level control circuit is set to a level ratio such as to extinguish the second harmonic distortion existing in said differential signal.

3. A stereo multiplex circuit in accordance with claim 1, wherein said multiplier cubes a differential signal of the right-channel and left-channel signals, and wherein said level control is set to a level ratio such as to extinguish the third harmonic distortion existing in said differential signal.

* * * * *